B. T. Norris,
Mortising Blinds
Nº 12,691.  Patented Apr. 10, 1855.
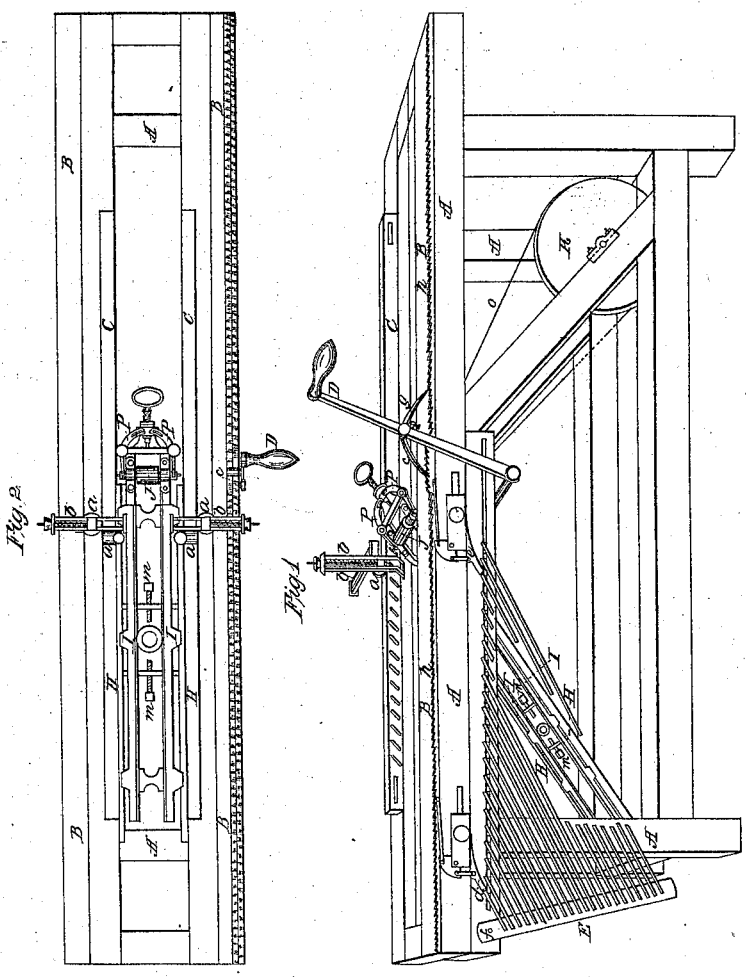
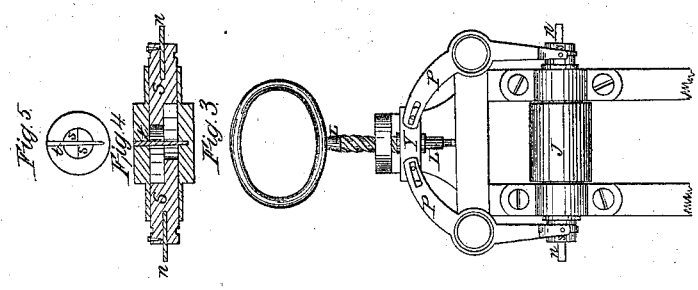

UNITED STATES PATENT OFFICE.

BENJ. T. NORRIS, OF LYNN, MASSACHUSETTS.

MACHINE FOR MORTISING BLINDS.

Specification forming part of Letters Patent No. 12,691, dated April 10, 1855.

*To all whom it may concern:*

Be it known that I, BENJAMIN T. NORRIS, of Lynn, in the county of Essex and State of Massachusetts, have invented a new and useful Machine for Making the Shade-Mortises in Blinds; and I do hereby declare that the following is a full, clear, and exact description of the construction and operation of the same, reference being had to the annexed drawings, making a part of this specification, in which—

Figure 1 is a perspective view. Fig. 2 is a plan view; Fig. 3, a view of the cutting-tool and its appendages; Fig. 4, a longitudinal section of the cutting-tool; Fig. 5, a transverse section of the same.

The same letters refer to the similar parts of the machine in different drawings.

A is the frame of the machine; B, a frame or platform sliding on the frame A, and carrying with it the piece of stock to be mortised.

C is the piece of stock to be mortised. It is fixed on the frame B by means of an adjustable tenon fitting within the end-rail mortises. It is further kept in place by the rollers $a\ a$, one of which presses on the top, the other against the side, of the stock by means of springs in the arms $b\ b$.

The stock and the appendages for keeping the same in place have been omitted on the near side in Fig. 1.

D is a handle and lever, attached to the stationary frame A, for moving forward the frame B and the piece to be mortised. The motion is effected by the intervention of the ratchet C, operating upon a rack fixed upon the frame B. The motion of the frame B, with the part of the blind to be mortised, and consequently the distances of the mortises from each other, are determined by the index E, into which the detents $d$ and $e$ fall. The detents $d$ and $e$ are intended severally for the two sets or series of mortises each side of the central-rail mortise. (Only one is attached to the model accompanying these papers.) The index is composed of bars, their upper ends moving freely in a groove cut in the frame A. The lower ends are attached by a movable joint to the bar $f$, the upper end of which is hinged to the frame A. Any motion of this bar pushes forward or back the ends of the oblique bars, thus varying the distance between them. The detents $d$ and $e$ are attached to the frame B, and are raised from the index by being connected to the rack $h$ by a rod or chain. They are to some extent movable in a groove in the frame B to accommodate the machine to different lengths in spacing of the shade-mortises.

The rack $h$ is operated by the backward motion of the handle D through the intervention of the ratchet $g$. On moving forward the handle D (with frame B, stock, &c.,) the detent passes over a division of the index, after which the ratchet $g$ rises from the rack $h$, leaving it free to be drawn forward by a spring for that purpose, thus depressing the detents upon the index and checking the motion of the stock in a proper position to receive the mortise.

Having thus described those parts of my machine intended for moving and regulating the piece to be mortised, I will now explain those parts intended for cutting the mortise.

$n\ n$ are two drills, bits, or cutters to which a rapid rotary motion is given. They have also a traverse motion corresponding to the direction and length of the mortise to be cut. The cutters are mounted upon a carriage, I, which slides in a frame, H. The frame H is hinged at the top to the frame of the machine, and the lower end can be altered to vary the inclination or obliquity of the mortise. The length of the mortise is determined by the screws $m\ m$. The cutters receive their rotary motion from the belt O, passing around the pulley J and driving-pulley K. The pulley J (see Figs. 4, and 5) is bored or hollow in its axis to receive the spindle S. The spindle S is made in two portions, the inner ends of which are halved, so as to fit each other and turn together, and at the same time move freely and steadily upon each other in a longitudinal direction. They are made to turn with the pulley J by means of a pin fixed in the pulley. This pin works in a slot cut in the ends of the spindles, leaving them free to move in the direction of their length. The cutters $n\ n$ are scooped out their whole length, and are confined in their places by a small screw. As the cutters wear off or break a fresh portion may be drawn out and again confined by the same means. The cutters are thrown outward from the pulley by means of the levers P P. The outer ends of the spindles, being grooved, receive a collar, to which the ends of the levers P P are attached (see Fig. 3) by pivots. Levers are operated by the handle and screw L through the intervention of the Y, which has pins working in slots in the ends of the bars. This method of operating the cutters I have adopted in preference to the device of the two handles shown in Fig. 3, caveat drawings.

The manner of operating my machine is as follows: The stock being fixed upon the frame B by means of the adjustable tenons, the handle D is drawn back, thus raising the detent from the index. It is then pushed forward until the frame is stopped by the index. The screw L is then turned so as to depress the upper ends of the levers P P, thus throwing out the cutters n n to a proper distance for the depth of the mortise. It is then drawn up so as to traverse the whole length of the mortise, when a backward motion of the screw withdraws the cutters from the stock, and the frame upon which the cutters are mounted slides down by its own weight, and is ready for another mortise, when the stock is again placed in the proper position.

The principle and operation of my machine having been thus stated, I desire to claim as my own invention—

1. The manner of constructing and operating the parts carrying the same—viz., the hollow pulley and spindle within the same—arranged as described, together with the levers attached, operated by the means described, or other suitable device.

2. The manner of operating and guiding the stock by the combination of the lever with the racks and the movable detents, as herein described, but do not claim the index constructed of bars, as described, that having been in use before.

BENJAMIN T. NORRIS.

Witnesses:
 THO. B. NEWHALL,
 JUSTIN H. HATCH.